Sept. 18, 1951  H. E. SLOAN ET AL  2,568,092
SWIVEL CONNECTION FOR AIR OPERATED CHUCKS
Filed April 25, 1947
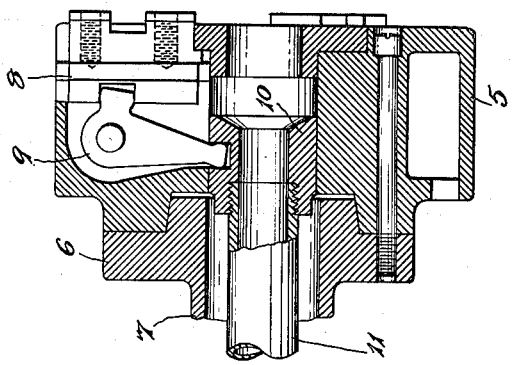
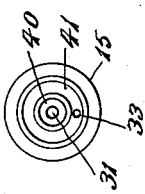
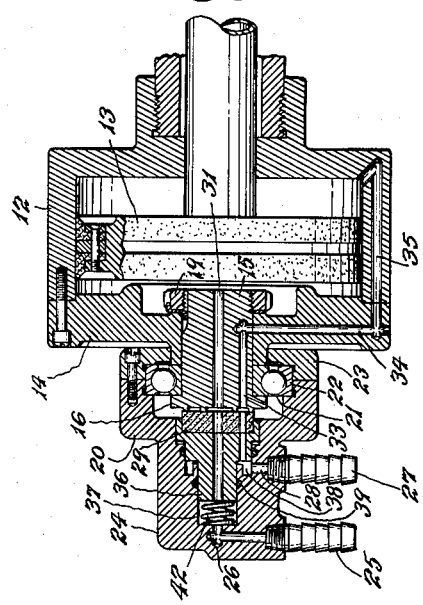
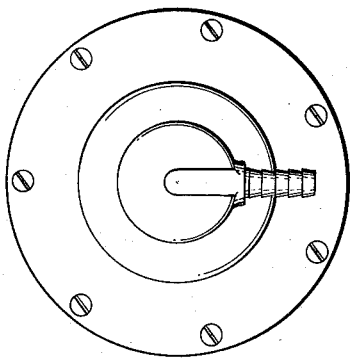
INVENTORS.
HARRY E. SLOAN.
BY GEORGE A. HIGHBERG
*Louis V. Lucia*
ATTORNEY.

Patented Sept. 18, 1951

2,568,092

UNITED STATES PATENT OFFICE 2,568,092

SWIVEL CONNECTION FOR AIR OPERATED CHUCKS

Harry E. Sloan, Hartford, and George A. Highberg, West Hartford, Conn., assignors to The Cushman Chuck Company, Hartford, Conn., a corporation of Connecticut Application April 25, 1947, Serial No. 743,784

13 Claims. (Cl. 285—21)

An object of the present invention is to provide a swivel connection having particular desirable features of construction differing from the structure of the co-pending application and which are particularly adapted to provide a highly efficient seal that is durable, simple in construction, trouble-free in its operation and easy to operate.

A further object of this invention is to provide a mechanism whereby a sealing member is retained in sealing position by the utilization of the pressure that is used for operating the chuck mechanism so as to increase the sealing effect of the sealing member in proportion to the amount of pressure to which the sealing mechanism is subjected.

Further objects and advantages of this invention will be more clearly understood from the following description and from the accompanying drawings in which:

Fig. 1 is a side view, in central vertical section, illustrating an embodiment of our invention as applied to a conventional form of air-operated chucks.

Fig. 2 is an elevational end view thereof.

Fig. 3 is an elevational end view of the sealing member used in the embodiment of our invention illustrated.

Fig. 4 is an end view of the sealing face on the rotatable member.

As shown in the drawings, the numeral 5 indicates a chuck of conventional form which is usually carried on a flange 6 of a hollow shaft 7 that is rotatably mounted in a bearing (not shown) of a machine tool, such as a lathe or the like. The said chuck may include the conventional jaws 8 that are operated by levers 9 which are rocked by means of a slidable operating member 10 that is connected to a drawbar 11 extending through the shaft 7.

On the end of said rotatable shaft 7, there is provided a cylinder 12 having therein a piston 13 which is connected to the end of the drawbar 11 for moving it longitudinally to slide the member 10 and operate the levers 9 for opening or closing the chuck by the selective application of air under pressure at either side of the piston 13.

Our invention is primarily directed to a swivel connection for connecting a supply of air pressure to said cylinder as it rotates with the chuck 5. In the embodiment of the invention as shown in the drawings, the cylinder 12 is provided with a head 14 upon which there is mounted a supporting spindle 15 having a disk-shaped head 16 providing a flange for securing the inner race of an anti-friction bearing to a hub on the head 14. The said spindle is secured to the head by suitable means such as a nut 19.

The said anti-friction bearing carries a stationary housing 20 having a shoulder 21 for receiving the outer race 22 of the bearing which is clamped thereon by means of a cover 23. Thus, the housing 20 is swivelly carried upon the head 14 by means of the said anti-friction bearing, as clearly illustrated in the drawings, to permit rotation of the cylinder 12 while the housing 20 remains stationary.

The said housing has a cylinder portion 24 extending therefrom to which are attached a nipple 25 communicating with an axial passage 26, and a nipple 27 which communicates with a separate passage 28 in the said cylinder portion.

In order to effect an efficient seal between the non-rotatable housing 20 and the rotatable cylinder 12, we provide a sealing member 29 in the form of a disk which is preferably constructed of a graphite material that has been found to be particularly suited for this purpose and which, since the said material may be impregnated with a lubricant, also provides a self-lubricating sealed bearing member that operates as a sealing brush between the stationary housing and the spindle 15 which rotates with the cylinder 12.

As shown in the drawings, the said sealing member is provided with an axial passage 30 therein, which aligns with an axial passage 31 in the spindle 15, that connects with the interior of the cylinder 12 at one side of the piston 13, and a separate passage 32 which communicates with a separate passage 33 in said stud that connects with the interior of the cylinder 12 at the opposite side of the piston 13, through the passage 34 in the head 14 and the passage 35 in the wall of the cylinder 12.

In order to resiliently retain the said sealing member 29 in sealing contact with a sealing surface on the end face of the spindle 15, as shown, the said member is carried in a carrier block or piston 36 which has a reduced portion slidable in a chamber 37 and an enlarged portion that is slidable in an annular chamber 38; the said sealing member being carried in a recess in the end of said piston providing a sealing surface at the bottom thereof.

The chamber 37 and the chamber 38 are sealed against the leakage of pressure past said piston by means of suitable packing rings 39 which bear against the sides of the piston and confines the pressure within the chamber 37 and the chamber 38.

It will be noted that the sealing face of the rotatable spindle 15 is provided with a central recess 40 which communicates the air passage 31 with the opening 30 in the sealing member and, therethrough, with the axial passage in the piston 36. The said sealing surface on the spindle 15 is also provided with an annular groove 41 which communicates with the separate passage 33 and, through the opening 32 in the sealing member, with a separate passage in the piston 36 which communicates with the annular chamber 38. The said recess 40 is of a lesser area than the chamber 37, and the groove 41 is of a lesser area than the surface of the piston 36 which is exposed to the interior of the annular chamber 38. A spring 42 is provided within the chamber 37 for urging the piston 36 in the direction of the sealing surface on the spindle 15 to thereby normally retain said sealing member in engagement therewith, the use of this spring being particularly important in assisting to maintain an efficient sealing connection when a low air pressure is used for operating the chuck.

In the operation of the illustrated embodiment of our invention, an air supply source is connected to the nipples 25 and 27 by means of suitable hose (not shown) and the supply of air through said nipples may be controlled by suitable valves which may be preferably of the two-way type. When a valve is opened to admit pressure through the nipple 25, the said pressure will flow through the chamber 37, the axial passage in the piston 36, the opening 30 and the passage 31 into the cylinder 12 at one side of the piston 13 so as to force said piston toward the chuck 5 and operate the lever 9 to open the jaws 8. During the said operation, the air under pressure passing through the chamber 37 will act upon the reduced portion of the piston 36 to force said piston in the direction of the sealing surface on the spindle 15 and thereby press the sealing disk 29 into contact with the said sealing surface and with a force proportionate to the degree of the pressure being supplied through the said swivel connection. Since the area of the recess 40 is less than the area of the end of the reduced portion of the piston 36, there will be provided a surplus of pressure tending to move the piston 36 to press the sealing disk 29 into contact with the sealing surface as above described.

During the above operation of the piston 13, the pressure within the opposite end of the cylinder 12 will be expelled through the passages 35, 34, 33, the opening 32, and the separate passage in the chamber 37, the annular chamber 38, the passage 28, and the nipple 27, and therefrom through the opening in the valve connected to said nipple.

When it is desired to close the jaws 8 of the chuck, pressure is admitted through the nipple 27 into the air chamber 38 and therefrom through the opening 32 and the sealing disk 29 and the other passages shown into the opposite side of the cylinder 12, to thereby cause the piston 13 to be moved in said cylinder in a direction away from the chuck 5. This will cause movement of the chamber 10 by the drawbar 11 to rock the levers 9 for closing the jaws 8.

As the pressure is admitted into the annular chamber 38, the piston 36 is moved to force the sealing disk 29 into engagement with the sealing surface on the spindle 15 and, since the area of the enlarged portion of said piston which is exposed to said annular chamber is greater than the area of the groove 41, there is provided a surplus of pressure which is applied for the pressing of the sealing member 29 against the said sealing surface to thereby insure an efficient seal against said pressure.

During this movement of the piston, the air from the opposite side of the cylinder will be expelled through the passage 31, the opening 30, the axial opening in the piston 36, the chamber 37, the passage 26 and the nipple 25 and outwardly through the discharge opening in the valve connected thereto.

From the above description, it will be clearly understood that our invention provides a novel and highly efficient swivel connection, for chuck operating air cylinders, which is particularly advantageous in that it assures an airtight seal between a rotating cylinder and a stationary air supply connection. At the same time, our invention provides a sealing member, such as the member 29, which is pressed into contact with a sealing surface in proportion to the amount of pressure passing through said connection to thereby assure a tight seal preventing leakage of said pressure, the said sealing member also permitting such a seal with a minimum of friction between the rotatable and the stationary members since it is relatively small in area, self-lubricating and requires only a small area for its sealing contact.

We claim:

1. A swivel connection including a spindle having separate passages therein, a connecting housing swivelly secured to said spindle, a connecting block slidable in said housing, a plurality of parallel air passages in said block, means for communicating said passages with a supply of air pressure, a sealing member in the form of a disk of self-lubricating graphite material having separate openings therethrough communicating the passages in the connecting block with the passages in said spindle, and a spring member urging said connecting block in one direction for retaining said sealing disk under pressure between said block and said spindle to thereby seal said passages against leakage.

2. A swivel connection comprising a spindle having a sealing surface, a stationary housing swivelly connected to said spindle, a piston in said housing, a sealing member between said piston and said sealing surface, and separate air passages in said housing communicating with the interior of said cylinder through said piston, sealing member and through the said sealing surface; the said passages including an air chamber in which a portion of the said piston is operable by pressure in said air chamber to press the said sealing member into sealing contact with the said sealing surface for preventing leakage of pressure from said passages.

3. A swivel connection including a spindle having a sealing surface, a housing swivelly connected to said spindle, a piston slidable in said housing, a sealing disk positioned between said piston and said sealing surface, an air passage extending through said piston sealing disk and spindle, and an air chamber in said housing intersecting said passage and having said piston movable therein whereby, upon the application of pressure through said connection, the said piston will be forced in the direction of the said sealing surface and thereby press said sealing disk thereagainst, proportionately to the degree of pressure in said passage, for sealing said passage against leakage.

4. A swivel connection including a spindle having a sealing surface, a stationary housing having an air passage extending therethrough, an air passage in said spindle communicating with the said passage in the housing through a sealing member in the form of a disk of graphite material between said stationary housing and the sealing surface on said spindle, the said housing having a pressure chamber therein communicating with the passage therein, and a piston in said chamber operable, upon pressure being supplied through the chamber, to move in the direction of the sealing surface and press the said sealing member against said sealing surface in proportion to the degree of said pressure for preventing leakage of the pressure from said passages.

5. A swivel connection including a spindle having a sealing surface, a stationary housing swivelly secured to said spindle and having a plurality of air chambers therein, a piston slidable in the housing and extending into each of said chambers, a plurality of air passages extending through said housing and spindle and communicating with said chambers, and a sealing disk carried by said piston in contact with the sealing surface on said spindle and having openings therethrough intersecting each of said passages; the said piston being operable upon the application of pressure through either of said chambers to press the sealing disk into contact with the sealing surface for preventing leakage of said pressure.

6. A swivel connection including a spindle having a sealing surface, a stationary housing swivelly secured to said spindle, air chambers in said housing, a piston slidable in said chambers, a sealing member carried by said piston and in engagement with said sealing surface, a plurality of air passages extending into said housing and through said air chambers, piston, sealing member and sealing surface and through said spindle; the said piston being operable upon the application of pressure through the said passages to press the sealing member into contact with said sealing surface to thereby prevent leakage of said pressure, and spring means for normally retaining said sealing member in engagement with said sealing surface.

7. A swivel connection comprising a spindle, a stationary housing swivelly secured to said spindle and having an axial chamber and a separate annular chamber therein, a carrier in the form of a piston slidable in said housing and having a reduced portion in the annular chamber, a sealing disk carried by said carrier in contact with a sealing surface on the said spindle, and passage extending into said housing and communicating through said chamber and through said carrier, sealing disk and sealing surface with a passage in said spindle.

8. A swivel connection including a spindle, a stationary housing swivelly secured to said spindle, a sealing surface on said spindle, the said housing having a pressure chamber therein, a piston slidable in said chamber, a sealing disk carried by said piston in contact with said sealing surface, and a passage extending through said stationary housing and into the spindle through the said chamber, piston, disk and recess in the sealing surface; the portion of said piston exposed to pressure in said chamber being of a larger area than the cross-sectional area of said passage, whereby, upon the application of pressure through said connection, pressure is applied to said piston in the direction of said sealing surface to thereby cause the piston to press the sealing disk into sealing contact with the sealing surface in proportion to the amount of pressure applied through said connection.

9. A swivel connection comprising a spindle, a stationary housing swivelly secured to said spindle, said housing having a plurality of chambers therein, a piston operable by pressure in either of said chambers, a sealing disk carried on said piston, a sealing surface on said spindle engaged by said disk, an axial passage having an opening in said surface and extending therefrom into said spindle, a groove surrounding said opening, a separate passage opening in said annular groove and extending therefrom into the spindle, an axial passage extending through said piston and communicating with the said axial passage in the spindle through said sealing disk, and a separate passage extending from another of said chambers through said piston and communicating with said annular groove through said sealing disk.

10. A swivel connection comprising a spindle, a stationary housing journaled on said spindle, a single sealing member between said housing and spindle, axial passages in said spindle and housing communicating through said sealing member, and separate passages in said spindle and housing also communicating through said sealing member.

11. A swivel connection comprising a stationary housing journaled on said spindle, the said housing having a plurality of passages extending therethrough and a separate air chamber communicating with each of said passages, a piston slidable in both of said chambers, sealing means cooperating with said piston for separating said chambers, a sealing member in the form of a disk carried by said piston, a sealing surface on said spindle, a plurality of separate passages in said spindle communicating with one of said chambers through separate passages in said sealing member and piston, and separate passages in said housing each communicating with one of the chambers therein.

12. A swivel connection including a rotatable spindle having an axial recess upon the end thereof, a plurality of raised concentric ribs upon the end of said spindle providing annular sealing surfaces and forming therebetween an annular groove concentric with said recess, a central passage in said spindle communicating with the recess, a separate passage in said spindle communicating with the annular groove, a piston slidable in said housing, a sealing disk carried by said piston and having a flat surface in engagement with the sealing surfaces of said annular ribs, spring means urging said piston to force the sealing disk in contact with the sealing surfaces, a passage in said housing communicating with the spindle through the said piston, a central opening in the sealing disk and the said recess, and a separate passage in said housing communicating with the separate passage in the spindle through the said piston, the said sealing disk, and the annular groove.

13. A swivel connection comprising a rotary spindle having a sealing surface in the end thereof, an axial passage extending from said surface into said spindle, an annular groove in said surface surrounding the opening to said axial passage, a separate passage extending from the bottom of said annular groove into said spindle, a stationary housing swivelly connected to said spindle, a carrier member slidable in said housing and having a flat sealing surface, a sealing member in the form of a disk having flat surfaces on opposite sides thereof engageable with the sealing surfaces on the spindle and carrier member, spring means urging said carrier member to force the sealing member into contact with said sealing surfaces, a passage in said housing communicating with the axial passage in the spindle through said carrier member and sealing member, and a separate passage in said housing communicating with the annular groove through said carrier member and sealing member.

HARRY E. SLOAN.
GEORGE A. HIGHBERG.

REFERENCES CITED

The following references are of record in the file of this patent:

UNITED STATES PATENTS

| Number | Name | Date |
|---|---|---|
| 872,358 | Liddell | Dec. 3, 1907 |
| 1,109,630 | Henrici | Sept. 1, 1914 |
| 1,851,723 | Neidow | Mar. 29, 1932 |
| 2,304,030 | Schmitter | Dec. 1, 1942 |
| 2,384,281 | Carter | Sept. 4, 1945 |
| 2,402,224 | Hornbostel | June 18, 1946 |
| 2,462,006 | Schmitter et al. | Feb. 15, 1949 |

FOREIGN PATENTS

| Number | Country | Date |
|---|---|---|
| 702,665 | Germany | of 1941 |